US012627959B2

(12) United States Patent
Saes et al.

(10) Patent No.: US 12,627,959 B2
(45) Date of Patent: May 12, 2026

(54) METHOD OF WIRELESS CONFIGURING AN LED DRIVER AND AN LED DRIVER ARRANGED TO BE CONFIGURED

(71) Applicant: eldoLAB Holding B.V., Son en Breugel (NL)

(72) Inventors: Marc Saes, Son en Breugel (NL); Maarten Lepelaars, Son en Breugel (NL)

(73) Assignee: eldoLAB Holding B.V., Son en Breugel (NL)

( * ) Notice: Subject to any disclaimer, the term of this patent is extended or adjusted under 35 U.S.C. 154(b) by 49 days.

(21) Appl. No.: 18/008,844

(22) PCT Filed: Jun. 7, 2021

(86) PCT No.: PCT/EP2021/065156
§ 371 (c)(1),
(2) Date: Dec. 7, 2022

(87) PCT Pub. No.: WO2021/249937
PCT Pub. Date: Dec. 16, 2021

(65) Prior Publication Data
US 2023/0217577 A1 Jul. 6, 2023

(30) Foreign Application Priority Data
Jun. 8, 2020 (NL) ..................................... 2025774

(51) Int. Cl.
*H05B 45/30* (2020.01)
*H04W 4/80* (2018.01)
(Continued)

(52) U.S. Cl.
CPC .............. *H04W 4/80* (2018.02); *H05B 47/19* (2020.01); *H05B 47/196* (2024.01)

(58) Field of Classification Search
CPC .... H05B 45/30; H05B 45/37; H05B 45/3725; H05B 47/10; H05B 47/175; H05B 47/19; H05B 47/1965; H04W 4/80
See application file for complete search history.

(56) References Cited

U.S. PATENT DOCUMENTS 10,278,244 B1 * 4/2019 Bahrehmand ........ H05B 45/325
2015/0120000 A1 4/2015 Coffey et al.
(Continued)

OTHER PUBLICATIONS

International Search Report (4 pages) and Written Opinion for International Application No. PCT/EP2021/065156, dated Jun. 7, 2021 (8 pages).
(Continued)

*Primary Examiner* — Long Nguyen
(74) *Attorney, Agent, or Firm* — Sikand IP Law PLLC

(57) ABSTRACT
A method of wireless configuring an LED driver is described. The LED driver comprises a power converter for powering an LED fixture, a BLE transceiver and an on-board power supply for powering the BLE transceiver, and a control unit for controlling the power converter and/or the LED fixture. The method comprising the steps of: transmitting a configuration signal representative of configuration data for the LED driver from an user interface to the BLE transceiver of the LED driver, generating configuration data for the LED driver based on the configuration signal, and configuring the LED driver according to the configuration data.

38 Claims, 2 Drawing Sheets

(51) Int. Cl.
  *H05B 47/175*    (2020.01)
  *H05B 47/19*    (2020.01)

(56)              References Cited

U.S. PATENT DOCUMENTS

2015/0296598 A1*  10/2015  Haid ...................... H05B 47/25
                                                315/291
2015/0373796 A1*  12/2015  Bahrehmand ........ H05B 45/325
                                                315/129

OTHER PUBLICATIONS

Office Action (Communication pursuant to Article 94(3) (EPC) issued Sep. 19, 2024, by the European Patent Office in corresponding European Patent Application No. 21 731 448.3-1201. (8 pages).

\* cited by examiner

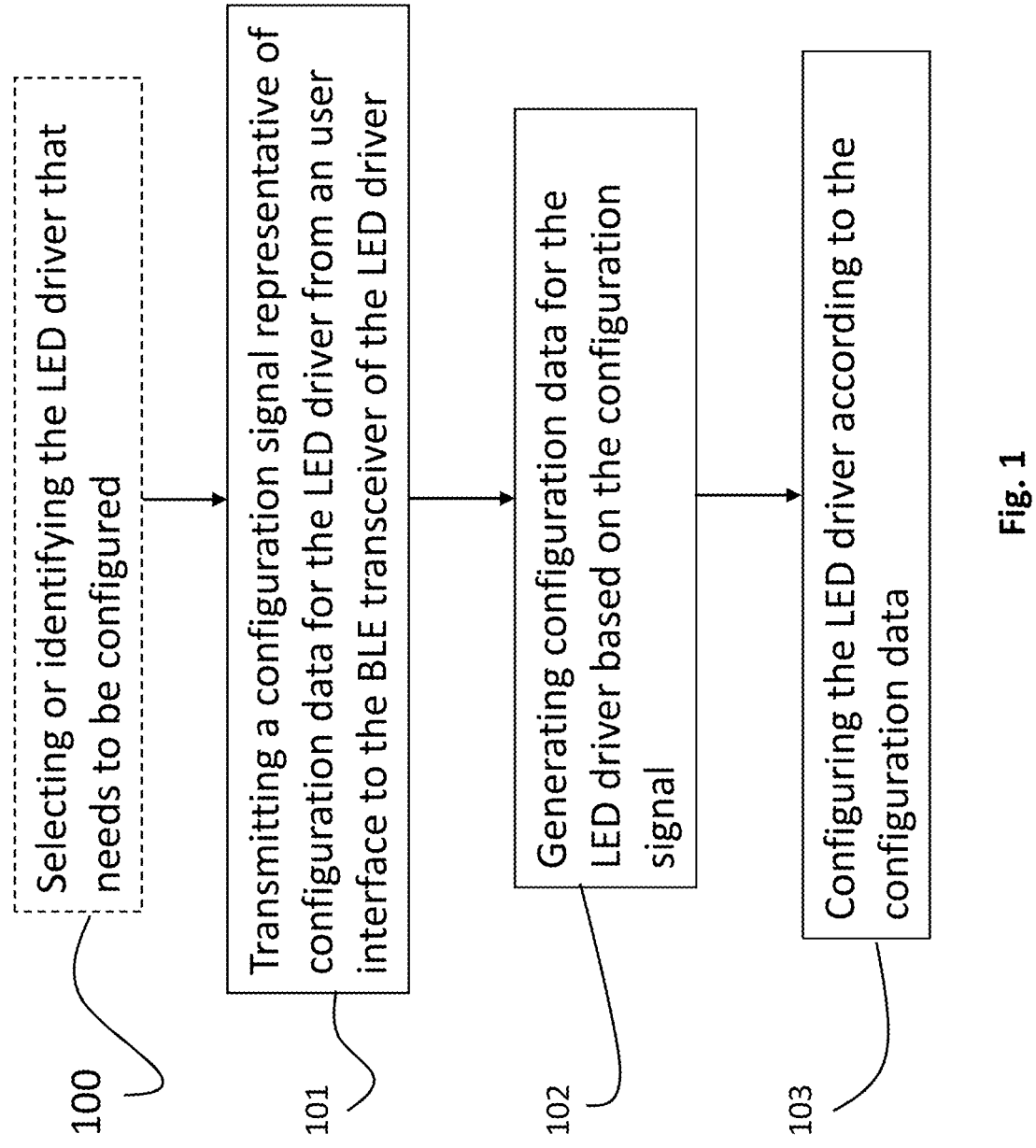

Selecting or identifying the LED driver that needs to be configured

Transmitting a configuration signal representative of configuration data for the LED driver from an user interface to the BLE transceiver of the LED driver Generating configuration data for the LED driver based on the configuration signal Configuring the LED driver according to the configuration data

METHOD OF WIRELESS CONFIGURING AN LED DRIVER AND AN LED DRIVER ARRANGED TO BE CONFIGURED

CROSS-REFERENCE TO RELATED APPLICATIONS

This application is a 371 filing of International Application No. PCT/EP2021/065156, filed Jun. 7, 2021, which claims priority to Netherlands Application No. NL 2025774, filed Jun. 8, 2020. The disclosures of these applications are incorporated herein by reference in their entireties for all purposes.

BACKGROUND

The technical field of the present invention relates to the configuration of LED drivers.

In general, an LED based product, e.g. a LED assembly, is driven by an LED driver under appropriate electrical conditions. In order to have an LED driver (an LED driver in general comprising a power converter for providing a power supply and a control unit for controlling the power converter and/or an LED fixture) drive a particular LED fixture under appropriate electrical conditions, such as LED current, duty cycle, color, maximum power dissipation, etc., the configuration of the LED driver is required.

It may be preferred to configure, or at least partly configure, an LED driver before the LED driver is installed, i.e. when the LED driver is not connected to a mains supply yet. Situations where the LED driver are not connected to the mains supply yet, is for example when a batch of LED drivers are manufactured and subsequently stacked on a shelf or on a pallet. The reason to configure the LED driver prior to installation may be to avoid that an installation and subsequent operation of the LED driver may be prone to errors, which may result in incorrect light output or even damaging of the LED fixture and/or the LED driver, due to exceeding a maximum current, maximum duty cycle, maximum power dissipation etc. of the LED fixture and/or the LED driver.

Configuration without the LED driver being connected to a mains supply can make use of wireless technology. In known applications, NFC (Near Field Communication) technology is used to configure the LED driver wirelessly. However, NFC has limitations such as short range (<10 cm) to power passive devices. For example, it will be very difficult to configure the right LED drivers from a plurality of LED drivers which are stacked on a shelf or on a pallet. There is an issue of selecting the required drivers for configuration and not the ones on e.g. a different remote shelf. Further, NFC has a limited transfer bandwidth and memory size capability.

SUMMARY OF THE INVENTION

In view of the above, it is a goal of the invention to provide an improved way of configuring an LED driver, wherein the abovementioned issues are mitigated or wherein the invention at least provides an alternative.

Yet another object of the present invention is to provide an LED driver arranged to be configured according to the invention.

According to a first aspect of the invention, there is provided a method of configuring an LED driver, the LED driver comprising a power converter for powering an LED fixture, a BLE transceiver, an on-board power supply for powering the BLE transceiver, and a control unit for controlling the power converter and/or the LED fixture, the method comprising the steps of:

transmitting a configuration signal representative of configuration data for the LED driver from an user interface to the BLE transceiver of the LED driver;

generating configuration data for the LED driver based on the configuration signal;

configuring the LED driver according to the configuration data.

The method according to the invention enables the configuration of an LED driver, whereby the LED driver comprises a power converter for powering an LED fixture, a BLE transceiver, an on-board power supply for powering the BLE transceiver, and a control unit for controlling the power converter and/or the LED fixture.

The method according to the invention comprises a first step of transmitting a configuration signal. The configuration signal is representative of configuration data for the LED driver. The configuration data can e.g. comprise operational parameters for the LED driver such as maximum current, a brightness vs. current characteristic, . . . etc. The configuration signal is transmitted by an user interface to a BLE (Bluetooth Low Energy) transceiver of the LED driver. The transmission of the configuration signal occurs via Bluetooth, i.e. via a wireless connection. The user interface can e.g. be an application of a user device, e.g. a portable device, which connects with the BLE transceiver. In an embodiment, the BLE transceiver enables a bi-directional communication between the LED driver and the user interface. Alternatively, the BLE transceiver is only configured to receive wireless communication, transmitted using the BLE wireless technology. The BLE transceiver typically operates at radio frequency (i.e. around 2.4 GHz), and can be integrated in an integrated circuit or chip of the LED driver. The advantage of the BLE transceiver is the short-range communication and operation at low power consumption.

In an embodiment, the transmission of the configuration signal occurs after a step of identifying the LED driver or LED drivers that need to be configured. The identification of the LED driver will be explained in more detail below.

Once having transmitted the configuration signal to the BLE transceiver of the LED driver, configuration data for the LED driver is generated based on the configuration signal. In an embodiment, the step of generating the configuration data comprises converting the configuration signal to the configuration data by the BLE transceiver. Subsequently, the BLE transceiver provides the configuration data to the control unit to configure the LED driver. In an embodiment, the BLE transceiver is connected to the control unit of the LED driver. Alternatively, the BLE transceiver is integrated in the control unit of the LED driver.

In an embodiment, the step of generating the configuration data is preceding by a step of transmitting the configuration signal from the BLE transceiver to the control unit. Subsequently, the step of generating the configuration data comprises converting the configuration signal to the configuration data by the control unit to configure the LED driver.

Once the control unit obtains the configuration data, the control unit can store the configuration data and use the configuration data when the LED driver is installed. In particular, upon installation and use, the LED driver can determine appropriate control signals for controlling the power converter of the LED driver, based on the obtained configuration data, said configuration data being obtained prior to the installation. As mentioned above, the configuration may e.g. comprise information concerning the LED
driver settings, so that the LED driver will operate correctly
once the LED driver is operational.

In an embodiment, the step of transmitting the configu-
ration signal from the user interface to the BLE transceiver
is preceding by a step of enabling a powering of the BLE
transceiver. As mentioned, during the configuration of the
LED driver using the method according to the invention, the
LED driver need not be connected to a mains power supply.
Under such conditions, the configuration process relies on a
powering of the LED driver using an on-board power
supply. In particular, use is made of an on-board power
supply to power the BLE transceiver, i.e. to make the BLE
transceiver operational. The on-board power supply, e.g. a
button cell battery, enables operation of the BLE transceiver
for a predetermined period of time, preferably one year, thus
allowing the LED driver to be configured prior to installa-
tion, e.g. while the LED driver is stored. For example, when
a particular LED driver is stored, e.g. in a warehouse, it is
assumed that the LED driver will be configured within a
predetermined period of time. In an embodiment, the battery
is enabled, e.g. by pulling a tab for the battery, only when
needed. Such a tab can e.g. be a pull tab sticker that isolates
the battery from the BLE transceiver. Once the tab sticker is
removed, the battery is connected to the BLE transceiver,
thus enabling the powering of the BLE transceiver. The tab,
e.g. the pull tab sticker, of the battery ensures that leakage
of current is limited. Button cell batteries for example are
well suited, because of the low power consumption and
relative small dimension compared to other batteries.

In another embodiment, the BLE transceiver is powered
by an NFC device, which acts as an on-board power supply.
The NFC device is arranged to link with the BLE transceiver
when the BLE transceiver needs power. However, this
option has the disadvantage that the two antennas are
required, which is not optimal and bulky. In addition, this is
an expensive approach. Therefore, preferably, the on-board
power supply is a compact built-in battery or capacitor or
super-capacitor with sufficient energy to power the BLE
transceiver within a predetermined period of time, e.g. one
year.

In an embodiment, the step of configuring the LED driver
according to the method according to invention is followed
by a step of connecting the LED driver to a mains power
supply. Once connected, the mains power supply, e.g. 230 V
at 50 Hz via an AC/DC converter, powers the BLE trans-
ceiver and the other components of the LED driver.

In an embodiment, the method according to the invention
further comprises the step of further configuring the LED
driver when the LED driver is connected to the mains power
supply. The step of further configuring of the LED driver can
e.g. be accomplished by connected the LED driver to a
communication network, e.g. a DALI network. Via the
communication network it is possible to further configure
the LED driver by uploading installation settings or uploading firmware data. A firmware update is a software update of
the LED driver, e.g. when a particular operating character-
istic of the LED driver (e.g. dimming characteristics) is
imperfect or erroneous.

In an embodiment, the configuration data as initially
provided to an LED driver can be adjusted before the
installation of the LED driver. Adjustments can be made to
the configuration data to take into account varying set points
of the LED driver according to the application, e.g. if an
operating characteristic, for example the light output
expressed in lumen, for a particular application has been
changed.

In an embodiment, the method according to the invention
further comprises a step of selecting the LED driver or LED
drivers that need to be configured by the user interface. The
step of selecting can e.g. comprise transmitting a selection
signal by the user interface. For example, the user interface
transmits once, or at a predetermined intervals, e.g. every
100 ms, the selection signal to probe the environment. The
selection signal can e.g. comprise an identifier of the LED
driver or drivers that need to be configured. When the right
LED driver receives the selection signal, the user interface
can e.g. connect with the LED driver, i.e. establish a wireless
communication between the user interface and the BLE
transceiver of the LED driver. When the right LED driver,
i.e. the LED driver that needs to be configured, receives the
selection signal, it can transmit an acknowledgment signal
or reply signal to the user interface, indicating to the user
interface that the selection signal has been received. When
the selecting signal comprises an identifier of the LED driver
that is to be configured, it can e.g. comprise, as the identifier,
a serial number of the LED driver. When the right LED
driver thus receives the selection signal, meaning that the
identifier, i.e. the serial number, of the selection signal
corresponds with the serial number of the LED driver
receiving the selection signal, the user interface can establish
wireless communication with the LED driver, e.g. to start the
configuration method according to the invention.

In an embodiment, the configuration data which is trans-
mitted via the configuration signal, comprises identification
data of the LED driver. In such embodiment, during the step
of configuring the LED driver, the identification data of the
configuration data is compared with an identifier of the LED
driver that is stored in the LED driver. The identifier of the
LED driver can be considered a kind of unique code of the
LED driver. When the identification data corresponds to the
identifier of the LED driver, the LED driver is configured
according to the configuration data. Other LED drivers
which may also receive the configuration signal with the
configuration data, will however not use said data because
the identification data stored in the configuration signal will
not correspond to the identifier of said other LED drivers.

By doing so, LED drivers can selectively be configured,
even when multiple LED drivers receive the configuration
signal.

In an embodiment, the control unit of the LED driver can
e.g. store an identifier of the LED driver. Accordingly, the
control unit can be arranged to transmit the identifier of the
LED driver to the user interface using the BLE transceiver,
or provide the identifier to the BLE transceiver in order for
the BLE transceiver to transmit the identifier. In such
embodiment, the BLE transceiver enables a bi-directional
communication between the LED driver and the user inter-
face. The BLE transceiver is arranged to transmit an iden-
tification signal, representative of the identifier stored in the
LED driver, to the user interface.

According to a second aspect of the invention, there is
provided a LED driver comprising a power converter for
powering an LED fixture and a control unit for controlling
the power converter and/or the LED fixture, wherein the
LED driver further comprises:
  a BLE transceiver,
  an on-board power supply for providing a supply power
    to the BLE transceiver, wherein the BLE transceiver is
    arranged to
  receive from an user interface a configuration signal
    representative of configuration data for the LED driver
    for configuring the LED driver.

In accordance with the present invention, the LED driver is, in general, applied for powering an LED fixture. The LED fixture may e.g. comprise a plurality of LEDs. The LED fixture may powered by a power converter, which power converter can be a switched mode power supply (SMPS). Such a switched mode power source may e.g. comprise an inductance, an unidirectional element such as a diode and a switching element, e.g. a FET or a MOSFET. The switching of the switching element can e.g. be controlled by a controller or control unit. At present, different types of power sources (in particular current sources) are applied for such powering of the plurality of LEDs. As an example, a so-called buck-regulator can be applied. It is further acknowledged that other types of power converters such as boost, buck-boost, CUK, SEPIC, flyback or other, either synchronous or non-synchronous may advantageously be applied in combination with the present invention.

The control unit may comprise any type of control unit, including e.g. analogue control electronics, digital control electronics, such as a micro controller, microprocessor, or any other suitable control device such as a Field Programmable Gate Array (FPGA), a programmable logic device (PLD), discrete logic electronics etc.

The LED driver according to the invention, can be configured before the LED driver is installed without connection to a mains power supply. In accordance with the present invention, the LED driver comprises a BLE transceiver, which is arranged to receive signals, e.g. from a user interface, and, optionally, transmits signals. The BLE transceiver can be paired with an user interface, e.g. an app of a portable device, if the user interface is near the LED driver. The BLE transceiver is arranged to receive from the user interface a configuration signal representative of configuration data for the LED driver for configuring the LED driver. To power the BLE transceiver, the LED driver comprises an on-board power supply. The on-board power supply can e.g. be a battery, preferably a rechargeable battery. In an embodiment, the on-board power supply is a button cell battery. The button cell battery has the benefit possessing a low power consumption and relative small dimension to be integrated into the LED driver.

In an embodiment, a BLE transceiver of the LED driver according to the invention is configured to receive, from an user interface, a configuration signal representative of configuration data for the LED driver. In particular, the BLE transceiver can wirelessly connect with the user interface and receive signals, e.g. via Bluetooth. In an embodiment the BLE transceiver of the LED driver is arranged to convert the configuration signal to the configuration data. In such embodiment, the BLE transceiver can be configured to transmit the configuration data to the control unit, in order to configure the LED driver.

In an alternative embodiment, the BLE transceiver transmits or provides the configuration signal to the control unit of the LED driver. The control unit is arranged to convert the configuration signal to the configuration data, in order to configure the LED driver.

The configuration data comprises operational data such as nominal current or a maximal current to be applied by the LED driver. Once configured and installed, the control unit can control the power converter conform the operational settings.

Before the LED driver is configured, the control unit can be arranged to read out an identifier stored in the LED driver. The identifier may e.g. be a serial number of the LED driver. The read out information can be exchanged from the control unit to the BLE transceiver. The BLE transceiver is arranged to transmit an identification signal, representative of the identifier stored in the LED driver, to the user interface. Consequently, the identification signal facilitates the user interface to decide if action is needed, e.g. transmitting the configuration signal to the BLE transceiver. Also, characteristics of the LED driver can be easily obtained without the need of an external power supply.

In an embodiment, the LED driver can be connected to a mains power supply after being configured. When the LED driver is configured according to the configuration data, LED driver can be further configured or installed once it is connected to the mains power supply. Once this is done, the mains power supply can be used to power the BLE transceiver of the LED driver. A further configuration can then be established by transmitting further configuration data from the user interface or a further user interface or configuration tool to the LED driver, in particular to the BLE transceiver of the LED driver. Alternatively, the LED driver is further configured by connecting the LED driver to a communication network, e.g. a DALI network. The communication network may then be used to transfers data to the LED driver, e.g. uploading firmware data.

In an embodiment, the LED driver according to the invention is configured to receive a selection signal, e.g. transmitted from a user interface to the BLE transceiver of the LED driver. For example, the user interface transmits at a predetermined interval, e.g. 100 ms, the selection signal to probe the environment. To select the right LED driver, the user interface for example scans an QR code of the LED driver. In practice, multiple or a batch of LED drivers are stacked, e.g. at shelves. To select the right LED driver from a batch, the selection signal may comprise an identifier of the LED driver that is to be configured. Only when the identifier corresponds to the right LED driver, the LED driver will be configured according to the configuration data.

In an embodiment, the configuration data as transmitted by the user interface, via the configuration signal, comprises identification data of the LED driver. The control unit compares the configuration data with an identifier of the LED driver that is stored in the LED driver. The control unit configures the LED driver according to the configuration data when the identification data corresponds to the identifier of the LED driver.

In an embodiment, the control unit comprises a control memory. The control memory is arranged to store the configuration data and/or the identifier of the LED driver. By a readout of the control memory, e.g. information related to performance of the LED driver can be extracted. The control memory enables diagnosis of the LED driver. Further, the control memory is accessible to perform a firmware update.

BRIEF DESCRIPTION OF THE FIGURES

Further advantages, embodiments and features of the invention will become clear from the appended figures and corresponding description, showing non-limiting embodiments in which:

FIG. 1 schematically depicts an embodiment of a flow diagram of the configuration method according to the invention.

DESCRIPTION

Figure 2:
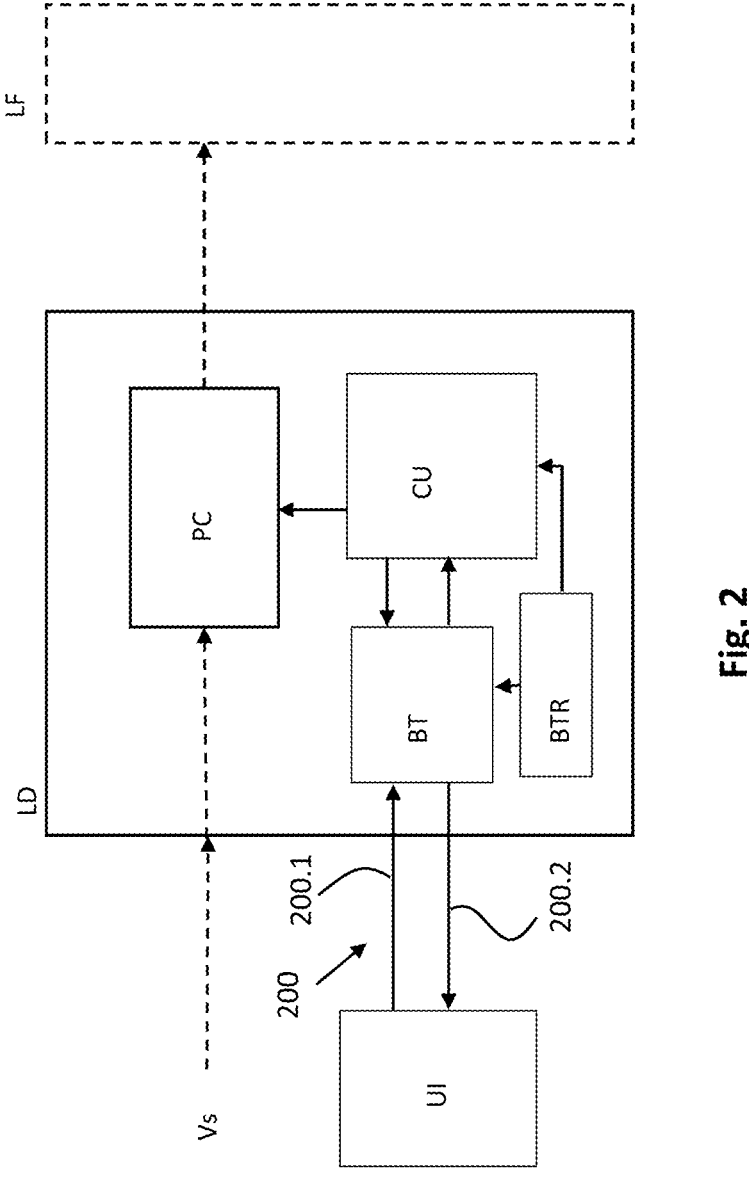
FIG. 2 schematically depicts an embodiment of an LED driver according to the invention.

FIG. 1 schematically depicts a flow diagram of an embodiment of the configuration method according to the invention for wireless configuring an LED driver. The configuration method according to the invention is intended for the configuration of an LED driver that comprises a power converter for powering an LED fixture, a BLE transceiver, an on-board power supply and a control unit. The on-boar power supply is configured to at least power the BLE transceiver. The control unit controls the power converter and/or the LED fixture.

The method according to the invention comprises a first step 101 of transmitting a configuration signal from an user interface to the BLE transceiver of the LED driver. The configuration signal is representative of configuration data for the LED driver. The configuration data can e.g. comprise operational parameters for the LED driver such as maximum current, a brightness vs. current characteristic, . . . etc. The configuration signal can e.g. be transmitted by an user interface to a BLE (Bluetooth Low Energy) transceiver of the LED driver. The transmission of the configuration signal occurs via Bluetooth, i.e. via a wireless connection. The user interface can e.g. be an application of a user device, e.g. a portable device, which connects with the BLE transceiver. In an embodiment, the BLE transceiver enables a bi-directional communication between the LED driver and the user interface. Alternatively, the BLE transceiver is only configured to receive wireless communication, transmitted using the BLE wireless technology. The BLE transceiver typically operates at radio frequency (i.e. around 2.4 GHz), and can be integrated in an integrated circuit or chip of the LED driver. The advantage of the BLE transceiver is the short-range communication and operation at low power consumption.

In an embodiment, the step 101 of the method according to the present invention, i.e. the transmission of the configuration signal, occurs after a step 100 of selecting or identifying the LED driver or LED drivers that need to be configured.

In such an embodiment, the method according to the invention thus comprises a step 100 of selecting the LED driver or LED drivers that need to be configured, e.g. by means of the user interface. The step of selecting can e.g. comprise transmitting a selection signal by the user interface. For example, the user interface transmits once, or at a predetermined intervals, e.g. every 100 ms, the selection signal to probe the environment. The selection signal can e.g. comprise an identifier of the LED driver or drivers that need to be configured. When the right LED driver receives the selection signal, the user interface can e.g. connect with the LED driver, i.e. establish a wireless communication between the user interface and the BLE transceiver of the LED driver. When the right LED driver, i.e. the LED driver that needs to be configured, receives the selection signal, it can transmit an acknowledgment signal or reply signal to the user interface, indicating to the user interface that the selection signal has been received. When the selecting signal comprises an identifier of the LED driver that is to be configured, it can e.g. comprise, as the identifier, a serial number of the LED driver. When the right LED driver thus receives the selection signal, meaning that the identifier, i.e. the serial number, of the selection signal corresponds with the serial number of the LED driver receiving the selection signal, the user interface can establish wireless communication with the LED driver, e.g. to start the configuration method according to the invention.

Alternative to the application of a separate step 100 for selecting or identifying the LED driver that needs to be configured, the configuration signal as applied in step 101 can contain identification data.

In such embodiment, the configuration data which is transmitted via the configuration signal in step 101 of the method according to the invention comprises identification data of the LED driver that needs to be configured. In such embodiment, the identification data of the configuration data can be compared with an identifier of the LED driver that is stored in the LED driver. The identifier of the LED driver can be considered a kind of unique code of the LED driver. When the identification data corresponds to the identifier of the LED driver, the LED driver is configured, see steps 102 and 103, according to the configuration data. Other LED drivers which may also receive the configuration signal with the configuration data, will however not use said data because the identification data stored in the configuration signal will not correspond to the identifier of said other LED drivers.

By doing so, LED drivers can selectively be configured, even when multiple LED drivers receive the configuration signal.

In an embodiment, the control unit of the LED driver can e.g. store an identifier of the LED driver. Accordingly, the control unit can be arranged to transmit the identifier of the LED driver to the user interface using the BLE transceiver, or provide the identifier to the BLE transceiver in order for the BLE transceiver to transmit the identifier. In such embodiment, the BLE transceiver enables a bi-directional communication between the LED driver and the user interface. The BLE transceiver is arranged to transmit an identification signal, representative of the identifier stored in the LED driver, to the user interface.

In a second step 102 of the method, configuration data for the LED driver is generated based on the configuration signal. In an embodiment, the step of generating the configuration data 102 comprises converting the configuration signal to the configuration data by the BLE transceiver. Subsequently, the BLE transceiver provides the configuration data to the control unit to configure the LED driver.

In an alternative embodiment, the step of generating the configuration data 102 is preceding by a step of transmitting the configuration signal from the BLE transceiver to the control unit. Subsequently, the step of generating the configuration data comprises converting the configuration signal to the configuration data by the control unit to configure the LED driver.

In case the configuration signal transmitted during step 101 contains an identifier of the LED driver that is to be configured, step 102 can be executed on the condition that the identifier of the LED driver that is to be configured corresponds to an identifier stored in the LED driver that has received the configuration signal.

In a third step 103 of the method according to the invention, the LED driver is configured according to the configuration data. Once the control unit obtains and has processed the configuration data, the control unit can control the power converter of the LED driver according to the configuration data.

In an embodiment, the method according to the invention can further comprises the step of connecting the LED driver to a mains power supply after being configured, i.e. after step 103. When the LED driver is configured according to the configuration data, LED driver can be further configured or installed once it is connected to the mains power supply. Once this is done, the mains power supply can be used to power the BLE transceiver of the LED driver. A further configuration can then be established by transmitting further configuration data from the user interface or a further user interface or configuration tool to the LED driver, in particular to the BLE transceiver of the LED driver. Alternatively, the LED driver is further configured by connecting the LED driver to a communication network, e.g. a DALI network. The communication network may then be used to transfers data to the LED driver, e.g. uploading firmware data.

FIG. 2 schematically shows an LED driver LD according to the present invention. In the embodiment as shown, the LED driver LD comprises a power converter PC for powering an LED fixture LF and a control unit CU for controlling the power converter PC and/or the LED fixture LF. In the embodiment as shown, the LED driver LD further comprises a BLE transceiver BT and an on-board power supply BTR for providing a supply power to the BLE transceiver BT.

During normal operation, i.e. when the LED driver LD is installed, the LED driver LD is powered by a power supply Vs, e.g. a DC power supply derived from a mains supply.

As further shown, the BLE transceiver BT is arranged to communicate with a user interface UI, as indicated by the arrows 200. In accordance with the present invention, the BLE transceiver BT of the LED driver LD according to the present invention is configured to receive, from the user interface UI, a configuration signal 200.1 representative of configuration data for the LED driver LD, i.e. for configuring the LED driver LD.

In accordance with the present invention, the LED driver LD is, in general, applied for powering an LED fixture LF. The LED fixture LF may e.g. comprise a plurality of LEDs. The LED fixture LF may powered by a power converter PC, which power converter PC can be a switched mode power supply (SMPS). Such a switched mode power source may e.g. comprise an inductance, an unidirectional element such as a diode and a switching element, e.g. a FET or a MOSFET. The switching of the switching element can e.g. be controlled by a controller or control unit CU of the LED driver LD. At present, different types of power sources (in particular current sources) are applied for such powering of the plurality of LEDs. As an example, a so-called buck-regulator can be applied. It is further acknowledged that other types of power converters such as boost, buck-boost, CUK, SEPIC, flyback or other, either synchronous or non-synchronous may advantageously be applied in combination with the present invention.

The control unit CU may comprise any type of control unit, including e.g. analogue control electronics, digital control electronics, such as a micro controller, microprocessor, or any other suitable control device such as a Field Programmable Gate Array (FPGA), a programmable logic device (PLD), discrete logic electronics etc.

The LED driver LD according to the invention, can be configured before the LED driver LD is installed, i.e. before the LED driver LD is connected to a mains power supply. In accordance with the present invention, the LED driver comprises a BLE transceiver BT, which is arranged to receive signals 200.1, e.g. from a user interface UI, and, optionally, transmits signals 200.2 to the user interface UI. The BLE transceiver BT can e.g. be paired with an user interface UI, e.g. an app of a portable device, if the user interface UI is near the LED driver LD. In accordance with the present invention, the BLE transceiver BT is arranged to receive from the user interface UI a configuration signal 200.1 representative of configuration data for the LED driver LD, i.e. for configuring the LED driver LD. To at least power the BLE transceiver BT, the LED driver LD according to the present invention comprises an on-board power supply BTR. The on-board power supply BTR can e.g. be a battery, preferably a rechargeable battery. In an embodiment, the on-board power supply BTR is a button cell battery. The button cell battery has the benefit possessing a low power consumption and relative small dimension to be integrated into the LED driver. In an embodiment, the on-board power supply BTR may also be configured to power the control unit CU in case the LED driver LD is not installed yet, i.e. not connected to any mains supply.

In an embodiment, a BLE transceiver BT of the LED driver LD according to the invention is configured to receive, from an user interface UI, a configuration signal 200.1 representative of configuration data for the LED driver LD. In particular, the BLE transceiver BT can wirelessly connect with the user interface UI and receive signals 200.1, e.g. via Bluetooth. In an embodiment the BLE transceiver BT of the LED driver LD is arranged to convert the configuration signal 200.1 to the configuration data. In such embodiment, the BLE transceiver BT can be configured to transmit the configuration data to the control unit CU, in order to configure the LED driver LD.

In an alternative embodiment, the BLE transceiver BT transmits or provides the configuration signal 200.1 to the control unit CU of the LED driver LD. The control unit CU is arranged to convert the configuration signal 200.1 to the configuration data, in order to configure the LED driver LD.

The configuration data can e.g. comprise operational data such as nominal current or a maximal current to be applied by the LED driver. Once configured and installed, the control unit CU can control the power converter PC conform the operational settings.

Before the LED driver LD is configured, the control unit CU can be arranged to read out an identifier stored in the LED driver LD, e.g. in a memory unit of the control unit CU. The identifier may e.g. be a serial number of the LED driver. The read out information can be exchanged from the control unit CU to the BLE transceiver BT. The BLE transceiver BT is arranged to transmit an identification signal, e.g. signal 200.2 shown in FIG. 2, representative of the identifier stored in the LED driver LD, to the user interface UI. Consequently, the identification signal 200.2 facilitates the user interface UI to decide if action is needed, e.g. transmitting the configuration signal 200.1 to the BLE transceiver BT. Also, characteristics of the LED driver LD can be easily obtained without the need of an external power supply.

In an embodiment, the LED driver LD can be connected to a mains power supply after being configured. When the LED driver is configured according to the configuration data, LED driver can be further configured or installed once it is connected to the mains power supply. Once this is done, the mains power supply can be used to power the BLE transceiver of the LED driver. A further configuration can then be established by transmitting further configuration data from the user interface or a further user interface or configuration tool to the LED driver, in particular to the BLE transceiver of the LED driver. Alternatively, the LED driver is further configured by connecting the LED driver to a communication network, e.g. a DALI network. The communication network may then be used to transfers data to the LED driver, e.g. uploading firmware data.

In an embodiment, the LED driver according to the invention is configured to receive a selection signal, e.g. transmitted from a user interface to the BLE transceiver of the LED driver. For example, the user interface transmits at a predetermined interval, e.g. 100 ms, the selection signal to probe the environment. To select the right LED driver, the user interface for example scans an QR code of the LED driver or a box containing the LED driver. In practice, multiple or a batch of LED drivers are stacked, e.g. in boxes on shelves. To select the right LED driver from a batch, the selection signal may comprise an identifier of the LED driver that is to be configured. Only when the identifier corresponds to the right LED driver, the LED driver will be configured according to the configuration data. As will be appreciated, the selection process need not focus or be limited to the selection of a single LED driver. A selection process may involve the selection of multiple LED drivers, e.g. a set of LED drivers that is to be installed in a particular application, e.g. in a particular room or area of a building. Selection multiple LED drivers for configuration can be established by transmitting a selection signal or configuration signal containing an identifier for each of the multiple LED drivers. Instead of sending a separate selection signal, the identification data or identifier of the to-be-configured LED drivers can be included in the configuration data.

As such, in an embodiment, the configuration data as transmitted by the user interface, via the configuration signal, comprises identification data of the LED driver. The control unit compares the configuration data with an identifier of the LED driver that is stored in the LED driver. The control unit configures the LED driver according to the configuration data when the identification data corresponds to the identifier of the LED driver.

In an embodiment, the control unit comprises a memory unit. The memory is arranged to store the configuration data and/or the identifier of the LED driver. By a readout of the control memory, e.g. information related to performance of the LED driver can be extracted. The memory may e.g. be used for storage of diagnostic information of the LED driver. Further, the memory can be used for storing any firmware update.

The invention claimed is:

1. A method of wireless configuring an LED driver to drive an LED fixture, the LED driver comprising a power converter for powering the LED fixture, a BLE transceiver and an on-board power supply for the LED driver, wherein the on-board power supply is configured to directly power the BLE transceiver during the configuring the LED driver, wherein the on-board power supply includes a battery, a capacitor, or a super-capacitor, the method comprising the steps of:

transmitting a configuration signal representative of configuration data for the LED driver from a user interface to the BLE transceiver of the LED driver;

generating the configuration data for the LED driver based on the configuration signal; and configuring the LED driver according to the configuration data, wherein the on-board power supply solely enables operation of the BLE transceiver, during the configuring of the LED driver within a period of time.

2. The method according to claim 1, wherein the step of configuring the LED driver is followed by a step of connecting the LED driver to a mains power supply, wherein the mains power supply powers the BLE transceiver.

3. The method according to claim 2, comprising the step of further configuring the LED driver when the LED driver is connected to the mains power supply.

4. The method according to claim 3, wherein the step of further configuring comprises a step of connecting the LED driver to a communication network, and further configuring the LED driver via the communication network to upload firmware data.

5. The method according to claim 1, wherein the step of generating the configuration data comprises converting the configuration signal to the configuration data by the BLE transceiver and providing the configuration data to a control unit for controlling the power converter by the BLE transceiver to configure the LED driver.

6. The method according to claim 1, wherein the step of generating the configuration data is preceded by a step of transmitting the configuration signal from the BLE transceiver to a control unit for controlling the power converter, and wherein the step of generating the configuration data comprises converting the configuration signal to the configuration data by the control unit to configure the LED driver.

7. The method according to claim 1, wherein the step of transmitting the configuration signal from the user interface to the BLE transceiver is preceded by a step of enabling a powering of the BLE transceiver by the on-board power supply.

8. The method according to claim 1, wherein the method further comprises the step of selecting the LED driver by the user interface.

9. The method according to claim 8, wherein the step of selecting comprises transmitting a selection signal by the user interface, the selecting signal comprising an identifier of the LED driver that is to be configured.

10. The method according to claim 1, wherein the configuration data comprises identification data of the LED driver.

11. The method according to claim 10, wherein the step of configuring the LED driver comprises:

comparing the identification data of the configuration data with an identifier of the LED driver that is stored in the LED driver, and configuring the LED driver according to the configuration data when the identification data corresponds to the identifier of the LED driver.

12. The method according to claim 11, wherein a control unit for controlling the power converter is arranged to read out the identifier of the LED driver stored in the LED driver.

13. The method according to claim 12, wherein the BLE transceiver receives the identifier of the LED driver from the control unit.

14. The method according to claim 13, wherein the BLE transceiver is arranged to transmit an identification signal, representative of the identifier stored in the LED driver, to the user interface.

15. The method according to claim 1, wherein the on-board power supply is arranged to power a control unit for controlling the power converter of the LED driver.

16. The method according to claim 1, wherein the configuration data comprises operational data such as a nominal current or a maximal current to be generated by the power converter.

17. The method according to claim 1, wherein the transmitting the configuration signal to the BLE transceiver is prior to an installation of the LED driver to drive the LED fixture.

18. The method of claim 1, wherein the on-board power supply includes the battery and the battery comprises a rechargeable battery or a button cell battery.

19. The method of claim 1, wherein the on-board power supply includes the capacitor or the super-capacitor.

20. An LED driver to drive an LED fixture, the LED driver comprising a power converter for powering the LED fixture and a control unit for controlling the power converter, wherein the LED driver further comprises:

a BLE transceiver, and an on-board power supply for the LED driver, wherein the on-board power supply is configured to directly power the BLE transceiver during a wireless configuring of the LED driver, wherein the on-board power supply includes a battery, a capacitor, or a super-capacitor, wherein the on-board power supply solely enables operation of the BLE transceiver, during the configuring of the LED driver within a period of time, wherein the BLE transceiver is arranged to receive from a user interface a configuration signal representative of configuration data for the LED driver for the wireless configuring the LED driver.

21. The LED driver according to claim 20, wherein the LED driver is connected to a mains power supply after the LED driver is configured according to the configuration data, wherein the mains power supply powers the BLE transceiver.

22. The LED driver according to claim 21, wherein the LED driver is further configured when the LED driver is connected to the mains power supply.

23. The LED driver according to claim 21, wherein the LED driver is connected to a communication network when the LED driver is further configured, wherein the LED driver is further configured by the communication network to upload firmware data.

24. The LED driver according to claim 20, wherein the BLE transceiver is arranged to convert the configuration signal to the configuration data, wherein the BLE transceiver provides the configuration data to the control unit to configure the LED driver.

25. The LED driver according to claim 20, wherein the BLE transceiver is configured to transmit the received configuration signal to the control unit, wherein the control unit is arranged to convert the configuration signal to the configuration data to configure the LED driver.

26. The LED driver according to claim 20, wherein the user interface is configured to transmit a selection signal to the LED driver, wherein the selection signal comprises an identifier of the LED driver that is to be configured.

27. The LED driver according to claim 20, wherein the configuration data comprises identification data of the LED driver.

28. The LED driver according to claim 27, wherein the control unit is configured to compare the identification data of the configuration data with an identifier of the LED driver that is stored in the LED driver, and wherein the LED driver is configured according to the configuration data when the identification data corresponds to the identifier of the LED driver.

29. The LED driver according to claim 28, wherein the control unit is arranged to read out the identifier of the LED driver stored in the LED driver.

30. The LED driver according to claim 29, wherein the BLE transceiver is arranged to receive the identifier of the LED driver from the control unit.

31. The LED driver according to claim 30, wherein the BLE transceiver is arranged to transmit an identification signal, representative of the identifier stored in the LED driver, to the user interface.

32. The LED driver according to claim 20, wherein the period of time is one year.

33. The LED driver according to claim 20, wherein the on-board power supply is arranged to power the control unit of the LED driver.

34. The LED driver according to claim 20, wherein the LED driver comprises a memory to store the configuration data and the identifier of the LED driver, wherein the memory enables diagnosis of the LED driver, and wherein the memory is accessible for storing a firmware update.

35. The LED driver according to claim 20, wherein the control unit comprises a memory to store the configuration data and the identifier of the LED driver, wherein the memory enables storing diagnostic data of the LED driver, and wherein the memory is accessible to store a firmware update.

36. The LED driver according to claim 20, wherein the configuration data comprises operational data such as a nominal current or a maximal current to be generated by the power converter.

37. The LED driver of claim 20, wherein the on-board power supply includes the battery and the battery comprises a rechargeable battery or a button cell battery.

38. The LED driver of claim 20, wherein the on-board power supply includes the capacitor or the super-capacitor.

\* \* \* \* \*